United States Patent
He et al.

(10) Patent No.: US 8,606,311 B2
(45) Date of Patent: Dec. 10, 2013

(54) CLOSED-LOOP ADAPTIVE POWER CONTROL FOR ADJUSTING BANDWIDTH IN A MOBILE HANDSET TRANSMITTER

(75) Inventors: Yongqiang He, Irvine, CA (US); John E. Vasa, Irvine, CA (US); Masoud Kahrizi, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 534 days.

(21) Appl. No.: 12/865,687

(22) PCT Filed: Feb. 7, 2009

(86) PCT No.: PCT/US2009/033497
§ 371 (c)(1),
(2), (4) Date: Jul. 30, 2010

(87) PCT Pub. No.: WO2009/100408
PCT Pub. Date: Aug. 13, 2009

(65) Prior Publication Data
US 2011/0021237 A1 Jan. 27, 2011

Related U.S. Application Data

(60) Provisional application No. 61/027,073, filed on Feb. 8, 2008, provisional application No. 61/027,078, filed on Feb. 8, 2008, provisional application No. 61/027,081, filed on Feb. 8, 2008.

(51) Int. Cl.
*H04B 7/00* (2006.01)

(52) U.S. Cl.
USPC ........................ 455/522; 122/127.1

(58) Field of Classification Search
USPC ..................... 455/127.1–127.3, 522; 370/318
See application file for complete search history.

(56) References Cited

U.S. PATENT DOCUMENTS

| | | | | |
|---|---|---|---|---|
| 5,862,460 A | * | 1/1999 | Rich | ........................... 455/116 |
| 6,169,449 B1 | * | 1/2001 | Hasegawa | ....................... 330/51 |

(Continued)

FOREIGN PATENT DOCUMENTS

| | | |
|---|---|---|
| CN | 101983528 | 3/2011 |
| EP | 1 309 094 | 5/2003 |

(Continued)

OTHER PUBLICATIONS

International Search Report issued in PCT/US2009/033497, dated Sep. 28, 2009 in 3 pages.

(Continued)

*Primary Examiner* — Raymond Dean
(74) *Attorney, Agent, or Firm* — Knobbe Martens Olson & Bear, LLP

(57) ABSTRACT

A mobile handset is arranged with an adaptive power controller to controllably adjust transmit power. The adaptive power controller is coupled to a power amplifier module to form a closed feedback loop. The adaptive power control module includes a first shifter, a first sealer, an accumulator and a hold element. The first shifter and first sealer receive respective bandwidth control signals and an error signal. The first shifter and first sealer generate a modified error signal that is forwarded to and filtered by the accumulator and the hold element to generate a power control signal. The power control signal, which is generated the radio frequency subsystem of the handset can quickly and accurately track rapid changes in transmit power.

20 Claims, 8 Drawing Sheets

(56) References Cited

U.S. PATENT DOCUMENTS

| | | | |
|---|---|---|---|
| 6,693,488 B1 | 2/2004 | Van Rhijn | |
| 7,148,749 B2 | 12/2006 | Rahman et al. | |
| 7,218,951 B2 | 5/2007 | Rozenblit et al. | |
| 7,353,006 B2* | 4/2008 | Gels et al. | 455/126 |
| 7,501,801 B2* | 3/2009 | Brown et al. | 323/224 |
| 8,326,340 B2* | 12/2012 | Nalbantis et al. | 455/522 |
| 2004/0248528 A1 | 12/2004 | Rozenblit et al. | |
| 2006/0170499 A1 | 8/2006 | Rahman et al. | |
| 2007/0161358 A1* | 7/2007 | Bogdan | 455/168.1 |
| 2007/0281652 A1 | 12/2007 | Tanaka et al. | |
| 2009/0054018 A1* | 2/2009 | Waheed et al. | 455/126 |

FOREIGN PATENT DOCUMENTS

| | | |
|---|---|---|
| JP | 2007-174325 | 7/2007 |
| JP | 2007-208525 | 8/2007 |
| JP | 2007-208525 A | 8/2007 |
| JP | 2007-324846 | 12/2007 |
| JP | 2011-515887 | 5/2011 |
| KR | 10-2010-0126731 | 12/2010 |
| KR | 10-2012-0081239 | 7/2012 |
| KR | 10-1242880 | 3/2013 |
| TW | 200947908 | 11/2009 |
| WO | WO 03/009481 | 1/2003 |
| WO | WO 2009/100408 | 8/2009 |

OTHER PUBLICATIONS

Written Opinion issued in PCT/US2009/033497, dated Sep. 28, 2009 in 3 pages.

International Preliminary Report on Patentability issued in PCT/US2009/033497, dated Aug. 10, 2010 in 4 pages.

Office Action issued in KR 10-2010-7020096, dated Jan. 5, 2012 in 4 pages.

Notice of Allowance issued in KR 10-2010-7020096, dated Dec. 21, 2012 in 2 pages.

Office Action issued in JP 2010-546082, mailed May 18, 2012 in 10 pages.

\* cited by examiner

CLOSED-LOOP ADAPTIVE POWER CONTROL FOR ADJUSTING BANDWIDTH IN A MOBILE HANDSET TRANSMITTER

CROSS REFERENCE TO RELATED APPLICATIONS

This application claims priority to the following U.S. provisional applications titled "Closed Loop Adaptive Power Control Using a Voltage Reference," having Ser. No. 61/027,073; "Closed Loop Constant-Bandwidth Power Control For Logarithmic Control Characteristics," having Ser. No. 61/027,078 and "Closed Loop Compensated-Bandwidth Power Control Using a Voltage Reference, having Ser. No. 61/027,081, all filed on Feb. 8, 2008, and which are entirely incorporated herein by reference.

BACKGROUND

This invention relates generally to transceiver architecture in a wireless mobile communication device.

Radio frequency (RF) transmitters are found in many one-way and two-way communication devices, such as mobile communication devices, (cellular telephones), personal digital assistants (PDAs) and other communication devices. A RF transmitter must transmit using whatever communication methodology is dictated by the particular communication system within which it is operating. For example, communication methodologies typically include amplitude modulation, frequency modulation, phase modulation, or a combination of these. In a typical global system for mobile communications (GSM) mobile communication system using narrowband time-division multiple access (TDMA), a Gaussian minimum shift keying (GMSK) modulation scheme is used to communicate data.

The deployment of new wireless systems presents unique challenges to mobile handset designers. In order to reap the full benefit of expanded capacity and increased data bandwidth, the new handsets must work on both the new systems as well as the old. One of these new systems has been named Enhanced Data Rates for GSM Evolution (EDGE). The EDGE standard is an extension of the Global System for Mobile Communications (GSM) standard.

The EDGE standard increases the data rate over that available with GSM by sending more bits per RF burst. More bits are sent in EDGE by using a modulation scheme based on 8-phase shift keying (8PSK), which provides an increase over GSM's Gaussian minimum shift keying (GMSK) modulation format. In the EDGE modulation scheme, the 8PSK constellation is rotated $3/8$ radians every symbol period to avoid problems associated with zero crossings. In contrast to GMSK's constant amplitude envelope, the EDGE modulation scheme results in a non-constant amplitude envelope. This non-constant amplitude in the output signal presents some difficulties with regard to RF power control.

During multi-slot operation of a mobile handset transmitter using 8PSK modulation, the power of the modulated radio-frequency (RF) signal is required to ramp-up to a desired power level for a set period of time during which the handset transmits encoded data symbols. After the transmission has completed, the power of the modulated RF signal is required to return or ramp down to an off power level. The ramp-up and ramp-down must be accomplished without adversely affecting time and frequency parameters defined by the EDGE communication standard.

One conventional approach to power control generates a signal that is used to controllably adjust the gain of a variable gain amplifier located in series with a linear power amplifier. For polar loop transmitter architectures, which are already operating near saturation in 8PSK mode, power control has been accomplished through power amplifier bias controls. These conventional power controllers require integrated circuit space, increase the power budget of the mobile handset and for some conditions require a longer time than that available to meet frequency spectrum requirements.

Another approach is introduced in U.S. Patent Application Publication 2005/0249312 to Bode et al. (the '312 publication). The '312 publication describes a digital modulator that introduces dips in the envelope of the I/Q signal between adjacent time intervals or bursts. A dip-shaped waveform is multiplied with each of the I and Q waveforms to introduce the dips. A pulse-shaping filter is used with the dip-shaped waveform to obtain the desired result in the envelope of the I/Q signal. This solution requires additional memory to store the dip waveform and integrated circuit space to implement the pulse-shaping filter.

In addition to the EDGE standard, some mobile networks communicate using a code division multiple access (CDMA) standard. In a communication system using CDMA, a base station transmits control messages and voice traffic to the mobile handsets on a forward link. The mobile handsets send control messages and voice traffic to the base station on a separate reverse link. While, both the forward and reverse links require power control, the main need for power control arises in the reverse link.

The reverse link requires power control primarily to solve the "near-far" problem. In a CDMA communication system, all handsets transmit on the same frequency channel at the same time but with different codes. Therefore, one handset's signal may interfere with the others. A particular mobile's received signal quality at the base station is inversely proportional to the power of the interference from other mobile handsets. The near-far problem arises when two mobile handsets transmit at the same power but at different distances from the base station. Due to different propagation losses, the transmissions can arrive with very different received power levels. The mobile handset nearer the base station, which has a high received signal power, greatly interferes with a more distant mobile handset, which under some circumstances may not be detected.

Power control in the reverse link also deals with the rapidly changing attenuation characteristics of multipath fading channels common in urban environments. In these environments, the received power of a typical wireless channel varies dramatically with time for moving handsets and multipath characteristics.

To solve problems encountered in urban environments, an open-loop power control algorithm ensures that the received power levels of all handsets are the same at the base station. The algorithm does this by controlling the transmit power from each of the separate mobile handsets. In general, a particular handset is commanded to transmit at a higher power level when their received power is low, such as when they are far from the base station. Additionally, handsets are commanded to transmit at a lower power level when their received power is high, such as when they are near the base station.

To control power in this manner, the algorithm regularly monitors the received power of each mobile handset and commands each handset to adjust its respective transmit power to achieve predefined performance levels, such as frame error rate (FER). The base station commands each of the handsets to set their transmit power levels with predefined step sizes for making rapid changes. This open-loop control scheme is unable to respond to rapid power changes such as those that occur due to the use of DC-to-DC converters in enhanced power amplifiers.

SUMMARY

An embodiment of a mobile handset includes a power amplifier module and an adaptive power controller. The power amplifier module includes a power amplifier and a power detector. The power amplifier receives a transmit signal and a power control signal and generates an amplified transmit signal. The power detector is configured to generate a detector output that is responsive to the amplified transmit signal power from the mobile handset. The adaptive power controller is coupled to the power amplifier module and forms a closed control loop. The adaptive power controller includes a first shifter, a first scaler, an accumulator and a hold element. The first shifter and the first scaler receive respective bandwidth control signals and together generate a modified error signal responsive to an error signal generated from a target power level and the detector output. The accumulator and hold element integrate and filter the modified error signal to generate the power control signal.

An embodiment of method for adaptive power control for adjusting bandwidth in a mobile handset includes the steps of using a power detector to detect an output power level generated by a power amplifier, generating an error signal responsive to a target power level and the output power level in a radio frequency sub-system of the mobile handset, and applying a bandwidth control signal to the error signal to generate a modified error signal in a closed control loop of an adaptive power controller in the mobile handset, the adaptive power controller controllably forwarding one of the modified error signal or a code to generate a power control signal in response to a desired range of transmit power.

The figures and detailed description that follow are not exhaustive. The disclosed embodiments are illustrated and described to enable one of ordinary skill to make and use the circuits for closed loop power control in a mobile handset. Other embodiments, features and advantages of the circuits for closed loop power control will be or will become apparent to those skilled in the art upon examination of the following figures and detailed description. All such additional embodiments, features and advantages are within the scope of the disclosed systems and methods as defined in the accompanying claims.

BRIEF DESCRIPTION OF THE FIGURES

The adaptive power controller and methods for adaptive power control in a mobile handset can be better understood with reference to the following figures. The components within the figures are not necessarily to scale, emphasis instead being placed upon clearly illustrating the principles and operation of the controller and methods. Moreover, in the figures, like reference numerals designate corresponding parts throughout the different views.

DETAILED DESCRIPTION

Figure 1:
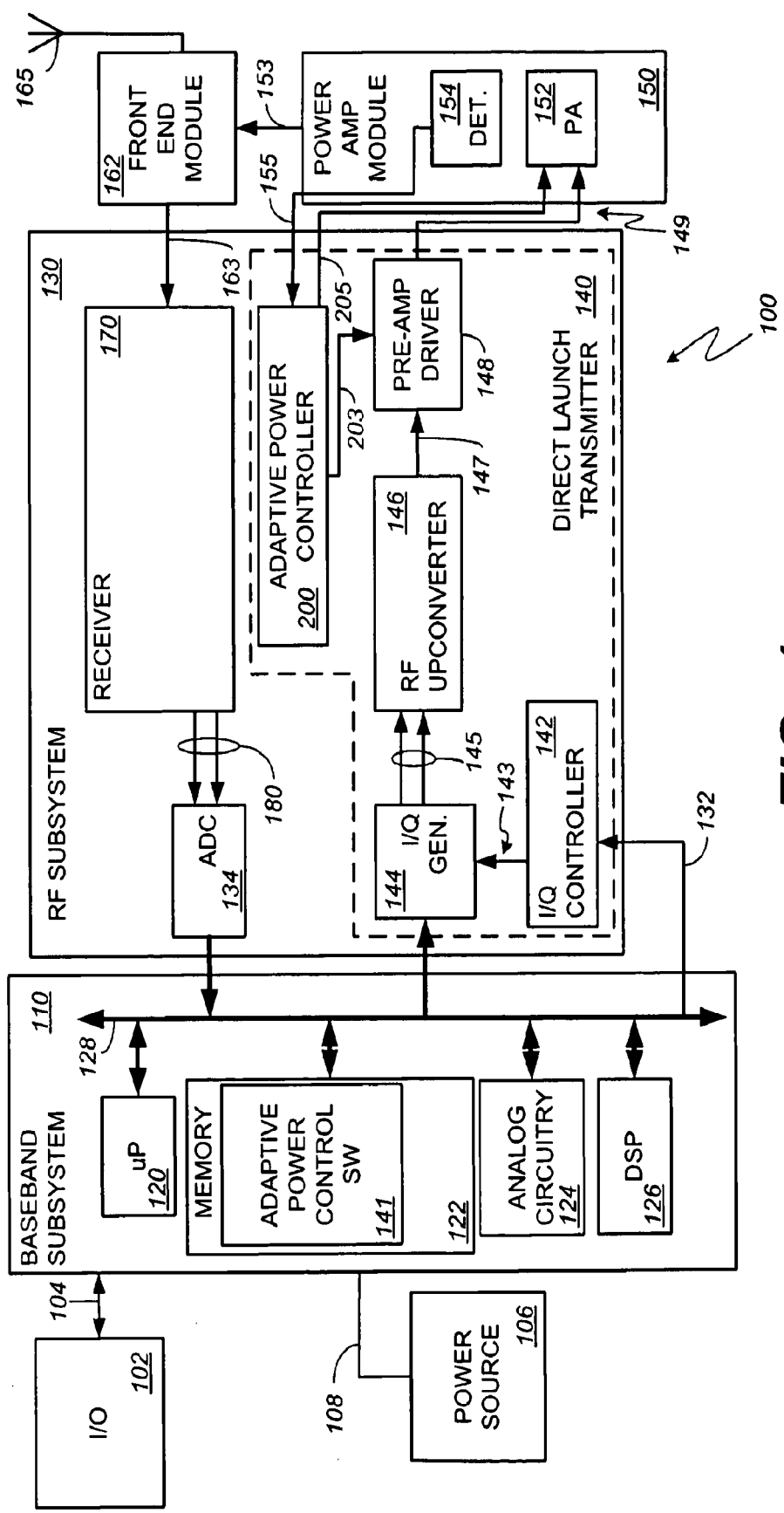
FIG. 1 is a block diagram illustrating a simplified mobile handset including a direct launch transmitter.

Although described with particular reference to a mobile handset operating under EDGE, WCDMA, and GMSK communication standards, the adaptive power controller and methods for adaptive power control in a mobile handset can be implemented in any communication device where dynamic power control of a direct launch transmitter is desired.

The adaptive power controller is arranged to accurately track and adjust for power changes in the transmit output power of the mobile handset that are expected to occur with greater frequency than those that can be accurately tracked and corrected using conventional open-loop power control schemes. The adaptive power controller uses a detector to locally measure the power level at a power amplifier. An error signal is generated as a function of the detected power level and a target power level forwarded from a baseband subsystem. The error signal is processed in a digital signal processor in a RF subsystem of the mobile handset. The digital signal processor can be configured in multiple embodiments to generate power adjustments that can be applied in near real time in response to transmit signal power changes that cannot be tracked and corrected by the conventional open-loop power control schemes.

In an embodiment illustrated in FIG. 2 and described in further detail below, the adaptive controller responds to a transmit power signal as measured by a linear detector. The detected transmit power is compared with a target power level converted to a voltage to generate an error signal. The error signal is applied to a shifter and a scaler that operate in accordance with respective bandwidth control signals generated by a loop bandwidth controller to generate a modified error signal.

The loop bandwidth controller compensates for the non-linearity of the gain control characteristics when the target power level exceeds a threshold value to make the loop bandwidth constant over a portion of the power control range. A threshold power level of approximately 0 dBm is contemplated. However, the adaptive controller is not so limited and other thresholds may be applied.

An accumulator and a hold element integrate and filter the modified error signal to reduce or even eliminate any undesired impact on the transmit signal error vector magnitude. When the target power level is below the threshold value, the adaptive controller applies a code from a look-up table. A control signal responsive to a gain adjust signal and the target power level is applied to the look-up table to select a particular code. The selected code is applied at the input of a digital-to-analog converter to generate an analog power control signal.

When the mobile handset is operating in a mode where a dB linear amplifier characteristic is desired, the analog version of the power control signal is applied to a pre-amplifier driver. Otherwise, when the mobile handset is operating in a mode where an accurate ramp up and ramp down are desired, the analog version of the power control signal is applied to the power amplifier gain control input.

In an embodiment illustrated in FIG. 4 and as described in further detail below, the adaptive controller responds to a transmit power signal as measured by a linear detector. The detected transmit power (a voltage) is mapped into antenna power in dBm using a logarithmic conversion. Alternatively, a logarithmic detector can be used to measure the transmit power.

The detected transmit power is compared with a target power level in dBm to generate an error signal. The error signal is applied to a shifter and a scaler that operate in accordance with respective bandwidth control signals consisting of a fixed value to generate a modified error signal.

The modified error signal is processed by an accumulator (i.e., integrated) and forwarded to a gain look-up table to identify a select code for gain control. The codes in the gain control look-up table linearize changes in the dB linear characteristic of the adaptive power controller to make the loop bandwidth constant over the entire power control range. A hold element averages or filters the selected codes to reduce or even eliminate any undesired impact on the transmit signal error vector magnitude. The output of the hold element is applied to a digital-to-analog converter to generate an analog power control signal.

The adaptive controller applies a code from a look-up table when the target power level is below the threshold value. A control signal responsive to a gain adjust signal and the target power level is applied to the look-up table to select a particular code. The code is applied at the input of a digital-to-analog converter to generate an analog power control signal.

When the mobile handset is operating in a mode where a dB linear amplifier characteristic is desired, the power control signal is applied to a pre-amplifier driver. Otherwise, when the mobile handset is operating in a mode where an accurate ramp up and ramp down are desired, the power control signal is applied to the power amplifier gain control input.

In an embodiment illustrated in FIG. 5 and described in further detail below, the adaptive controller responds to a transmit power signal as measured by a linear detector. The detected transmit power is compared with a target power level converted to a voltage to generate an error signal. The error signal is applied to a shifter and a scaler that operate in accordance with respective bandwidth control signals generated by a loop bandwidth controller to generate a modified error signal.

The modified error signal is processed by an accumulator (i.e., integrated) and forwarded to a multiplexer, which in accordance with a loop mode control signal selects one of a bypass path or a logarithmic control path. The logarithmic control path includes a log converter, a second shifter and a second scaler. A slope compensator generates respective control signals that are applied to the second shifter and the second scaler, which further process the modified error signal. A second multiplexer under the control of the loop mode control signal, selectively forwards the modified error signal from one of the bypass path or the logarithmic control path to a hold element.

The hold element averages or filters the modified error signal to reduce or even eliminate any undesired impact on the transmit signal error vector magnitude. For voltage linear gain control characteristics, slope compensation is applied before the accumulator. For dB linear gain control characteristics, slope compensation is applied after the accumulator. The adaptive power controller applies bandwidth controls at select locations to compensate for the nonlinearity of the gain control characteristics when the target power level exceeds a threshold value to make the loop bandwidth constant over a portion of the power control range. A threshold power level of approximately 0 dBm is contemplated. However, the adaptive controller is not so limited and other thresholds may be applied.

The adaptive controller applies a code from a look-up table when the target power level is below the threshold value. A control signal responsive to a gain adjust signal and the target power level is applied to the look-up table to select a particular code. The code is applied at the input of a digital-to-analog converter to generate an analog power control signal. When the mobile handset is operating in a mode where a dB linear amplifier characteristic is desired, the power control signal is applied to a pre-amplifier driver. Otherwise, when the mobile handset is operating in a mode where an accurate ramp up and ramp down are desired, the power control signal is applied to the power amplifier gain control input.

The adaptive power controller and methods for adaptive power control in a mobile handset can be implemented in hardware, software, or a combination of hardware and software. When implemented in hardware, the adaptive power controller and methods can be implemented using specialized hardware elements and logic. When the adaptive power controller and methods are implemented partially in software, the software portion can be used to control one or more components of the adaptive controller so that various operating aspects can be software controlled. The software can be stored in a memory and executed by a suitable instruction execution system (microprocessor). The hardware implementation of the adaptive power controller and methods can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the adaptive power controller and methods comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Reference is now directed to example embodiments of the adaptive power controller and methods for adaptive power control in a mobile handset as illustrated in the drawings.

FIG. 1 is a block diagram illustrating a mobile handset 100 including a direct launch transmitter 140, which includes an I/Q generator 144, an I/Q controller 142 for initiating ramp power transitions and a RF upconverter 146 for generating a RF transmit signal in the mobile handset 100. The mobile handset 100 includes an input/output (I/O) element 102 coupled to a baseband subsystem 110 via connection 104. The I/O element 102 represents any interface with which a user may interact with the mobile communication device 100. For example, the I/O element 102 may include a speaker, a display, a keyboard, a microphone, a trackball, a thumbwheel, or any other user-interface element. A power source 106, which may be a direct current (DC) battery or other power source, is also connected to the baseband subsystem 110 via connection 108 to provide power to the mobile handset 100. In a particular embodiment, mobile handset 100 can be, for example but not limited to, a mobile telecommunication device such as a mobile cellular-type telephone.

The baseband subsystem 110 includes microprocessor (μP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the I/Q controller 142 and methods for adaptive power control are implemented, the baseband subsystem 110 may also include one or more of an application specific integrated circuit (ASIC), a field programmable gate array (FPGA), or any other implementation-specific or general processor.

Microprocessor 120 and memory 122 provide the signal timing, processing and storage functions for the mobile handset 100. Analog circuitry 124 provides the analog processing functions for the signals within baseband subsystem 110. The baseband subsystem 110 provides data and control signals to a radio frequency (RF) subsystem 130. The RF subsystem 130 receives data from remote transmitters (e.g., base stations) and forwards the received data to the baseband system 110 for further processing. The RF subsystem 130 includes the direct launch transmitter 140, a receiver 170, a pre-amplifier driver 148, and an adaptive power controller 200. The elements within the RF subsystem 130 can be controlled by signals from the baseband subsystem 110 via connection 132, which is connected to various baseband elements via bus 128. Alternatively, the direct launch transmitter 140 and the receiver 170 may be located on an RF integrated circuit (IC).

The baseband subsystem 110 generates various control signals, such as a target power signal, a fixed bandwidth control signal, a power amplifier gain adjustment signal, etc. that are used to control the adaptive power controller 200. The control signals on connection 132 may originate from the DSP 126, the microprocessor 120, or from any other processor within the baseband subsystem 110, and are supplied to a variety of connections within the direct launch transmitter 140, receiver 170, and the adaptive power controller 200. It should be noted that, for simplicity, only the basic components of the mobile handset 100 are illustrated herein. The control signals provided by the baseband subsystem 110 control the various components within the mobile handset 100.

The adaptive power controller 200 generates a power amplifier (PA) power control signal. The power control signal is coupled to the power amplifier 152 via connection 205. The power control signal controls the power output of the power amplifier 152 based on various inputs from the baseband subsystem 110. For example, in an embodiment, a closed power control loop influences the power output of the power amplifier 152. In another embodiment, an open power control loop influences the power output of the power amplifier 152. For example, in an embodiment, a signal received by a base station with which the mobile handset 100 is communicating may issue a power control signal. In other embodiments, the baseband subsystem 110 provides loop bandwidth, closed/open loop enable, and various offset signals to the adaptive power controller 200. In turn, the adaptive power controller 200 processes the signals and generates a power control signal that is communicated to the power amplifier 152 on connection 205 or to the pre-amplifier driver 148 on connection 203.

If portions of the I/Q controller 142 and methods for adaptive power control in a mobile handset 100 are implemented in software that is executed by the microprocessor 120, the memory 122 will also include adaptive power control software 141. The adaptive power control software 141 comprises one or more executable code segments that can be stored in the memory 122 and executed in the microprocessor 120. Alternatively, the functionality of the adaptive power control software 141 can be coded into an ASIC (not shown) or can be executed by an FPGA (not shown), or another device or may be integrated into a transceiver. Because the memory 122 can be rewritable and because a FPGA is reprogrammable, updates to the adaptive power control software 141 can be remotely sent to and saved in the mobile handset 100 when implemented using either of these methodologies.

RF subsystem 130 also includes analog-to-digital converter (ADC) 134 and an in-phase quadrature-phase (I/Q) generator 144. In this example, the I/Q generator 144 generates the in-phase (I) and quadrature-phase (Q) signals. The I/Q or transmit signals are forwarded to the RF upconverter 146 via connection 145. The ADC 134 and the I/Q generator 144 also communicate with microprocessor 120, memory 122, analog circuitry 124 and DSP 126 via bus 128. The I/Q generator 144 converts the digital communication information within baseband subsystem 110 into a digital signal for further processing by the RF upconverter 146 for transmission by the direct launch transmitter 140.

The I/Q generator 144 generator operates in accordance with a control signal provided on connection 143 from the I/Q controller 142. The I/Q controller 142, operating in accordance with one or more signals on bus 132, controllably transfers a modulated I signal and a modulated Q signal to respective transmit chains and mixers for upconversion to a transmit frequency. The RF upconverter 146 of the direct launch transmitter 140 combines and transforms the modulated signals to an appropriate transmit frequency and provides the upconverted signal to the pre-amplifier driver 148 via connection 147. The pre-amplifier driver 148 controllably amplifies the transmit signal before forwarding the pre-amplified transmit signal on connection 149 to the power amplifier module 150. A power amplifier 152 amplifies the transmit signal to an appropriate power level for the handset given present conditions under which the mobile handset 100 is operating.

The I and Q components of the transmit signal may take different forms and be formatted differently depending upon the communication standard being employed. For example, when the power amplifier module 150 is used in a constant-amplitude, phase (or frequency) modulation application such as the global system for mobile communications (GSM), the phase modulated information is provided by a modulator within the direct launch transmitter 140. When the power amplifier module 150 is used in an application requiring both phase and amplitude modulation such as, for example, extended data rates for GSM evolution, referred to as EDGE, the Cartesian in-phase (I) and quadrature (Q) components contain both amplitude and phase information.

The power amplifier module 150 supplies the amplified transmit signal via connection 153 to a front end module 162. The front end module 162 comprises an antenna system interface that may include, for example, a diplexer having a filter pair that allows simultaneous passage of both transmit signals and receive signals, as known to those having ordinary skill in the art. The transmit signal is supplied from the front end module 162 to the antenna 165.

A signal received by the antenna 165 is directed from the front end module 162 to the receiver 170 on connection 163. The receiver 170 includes various components to downconvert, filter, demodulate and recover a data signal from a received signal, as known to those skilled in the art. If implemented using a direct conversion receiver (DCR), the receiver 170 converts the received signal from an RF level to a baseband level (DC), or a near-baseband level (~100 kHz). Alternatively, the received RF signal may be downconverted to an intermediate frequency (IF) signal, depending on the system architecture. The recovered transmitted information is supplied via connection 180 to the ADC 134. The ADC 134 converts these analog signals to a digital signal at baseband frequency and transfers the signal via bus 128 to DSP 126 for further processing.

Figure 2:
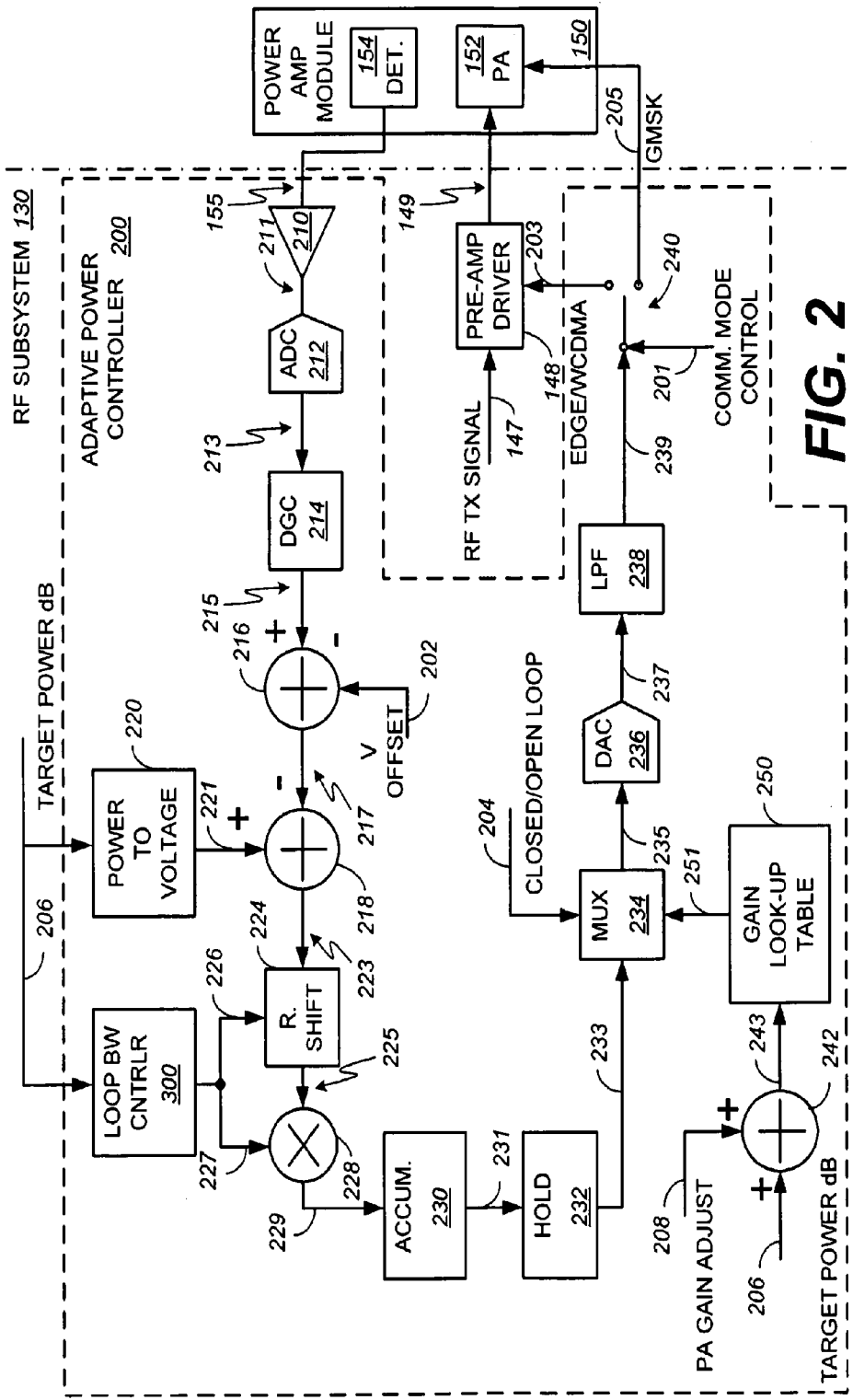
FIG. 2 is a block diagram illustrating an example embodiment of the adaptive power controller of FIG. 1.

FIG. 2 is a block diagram illustrating an example embodiment of the adaptive power controller 200 of FIG. 1. The combination of the power amplifier module 150 and the adaptive power controller 200 forms closed and open power control loops for adjusting transmit power levels in near real time. The adaptive power controller 200 receives multiple signals from the baseband subsystem 110 that direct the adaptive power controller 200 to apply one of a closed control loop or an open control loop within the RF subsystem 130 of the handset. The adaptive power controller 200 receives a communication mode control signal on connection 201, a voltage offset signal on connection 202, a closed/open loop control signal on connection 204, a target power level in dB on connection 206, and a power amplifier gain adjust signal on connection 208. In response, the adaptive power controller 200 generates an analog power control signal.

The detector 154 within the power amplifier module 150 forwards a detected transmit power signal on connection 155 to preamp 210, which buffers and amplifies the detected transmit power signal before forwarding the signal on connection 211 to an analog-to-digital converter (ADC) 212. The ADC 212 converts the analog voltage to a digital signal and forwards the same on connection 213 to the digital gain control element (DGC) 214. The DGC 214 scales and forwards the digital version of the detected transmit power on connection 215 to the adder 216. The adder 216 subtracts the voltage offset signal on connection 202 from the digital version of the detected transmit power signal and forwards the result on connection 217 to the adder 218.

The target power level received on connection 206 is converted from a log value (in dBm) to a linear unit (volts) by the power to voltage converter 220, which forwards the result on connection 221 to the adder 218. The adder 218 subtracts the detected and offset adjusted transmit power signal from the target power level in volts to generate an error signal, which is forwarded on connection 223 to a right shifter 224.

As illustrated in FIG. 2, the target power level received on connection 206 is coupled to a loop bandwidth controller 300 that generates a first bandwidth control, which is forwarded on connection 226 to a control input of the right shifter 224. In addition, the loop bandwidth controller 300 generates a second bandwidth control signal, which is forwarded to a scaler 228 on connection 227. The right shifter processes the error signal in accordance with the first bandwidth control signal and forwards the shifted error signal on connection 225 to the scaler 228. The scaler 228 adjusts the shifted error signal in accordance with the second bandwidth control signal to generate a modified error signal, which is forwarded to the accumulator 230 on connection 229. The accumulator 230 integrates the modified error signal and forwards the result on connection 231 to the hold element 232. The hold element 232 filters or averages the integrated version of the modified error signal and forwards the result on connection 233 to a first data input of the multiplexer 234.

When directed by the closed/open loop signal on connection 204 to operate in a closed loop, that is when the target power level exceeds a predetermined threshold value, the multiplexer 234 forwards the integrated and filtered version of the modified error signal on connection 235 to the digital-to-analog converter (DAC) 236. The DAC 236 converts the integrated and filtered version of the modified error signal to generate an analog power control signal, which is forwarded on connection 237 to the low-pass filter (LPF) 238. The LPF 238 reduces or eliminates high-frequency signal components that may be present in the power control signal before forwarding the filtered power control signal on connection 239 to the switch 240. As indicated in FIG. 2, the switch 240 directs the power control signal to the pre-amplifier driver 148 on connection 203 when the communication mode control signal on connection 201 indicates that the handset is operating under an EDGE/WCDMA communication mode. Otherwise, the switch 240 directs the power control signal to the power amplifier 150 on connection 205 when the communication mode control signal on connection 201 indicates that the handset of operating under a GMSK communication mode.

The adaptive power controller 200 receives the target power level on connection 206 and a power amplifier gain adjust control signal on connection 208 which are coupled to the inputs of the adder 242. The power amplifier gain adjust control signal received from the baseband subsystem 110 is responsive to one or both of a present temperature and a desired transmit frequency band of the handset. The adder 242 generates and forwards a combined signal which is applied at an index input of the gain look-up table 250. In turn the gain look-up table forwards a code on connection 251 to a second data input of the multiplexer 234. When the target power level is below the threshold value, the closed/open loop control signal on connection 204, directs the multiplexer 234 to forward the code on connection 235 to the DAC 236. In this open loop mode of operation, the code as converted by the DAC 236 becomes the power control signal that is low-pass filtered and forwarded to one of the pre-amplifier driver 148 or the power amplifier 150 as described above. The closed-loop adaptive bandwidth control illustrated and described above in association with FIG. 2, is responsive to a voltage representation of the transmit power level. The control scheme permits the re-use of the closed-loop components for both WCDMA and EDGE/GMSK communication standards. The proposed scheme is also suitable for providing a full range of transmit power control as well as controlled power ramp-up and ramp-down transitions in EDGE/GMSK mode.

Figure 3:
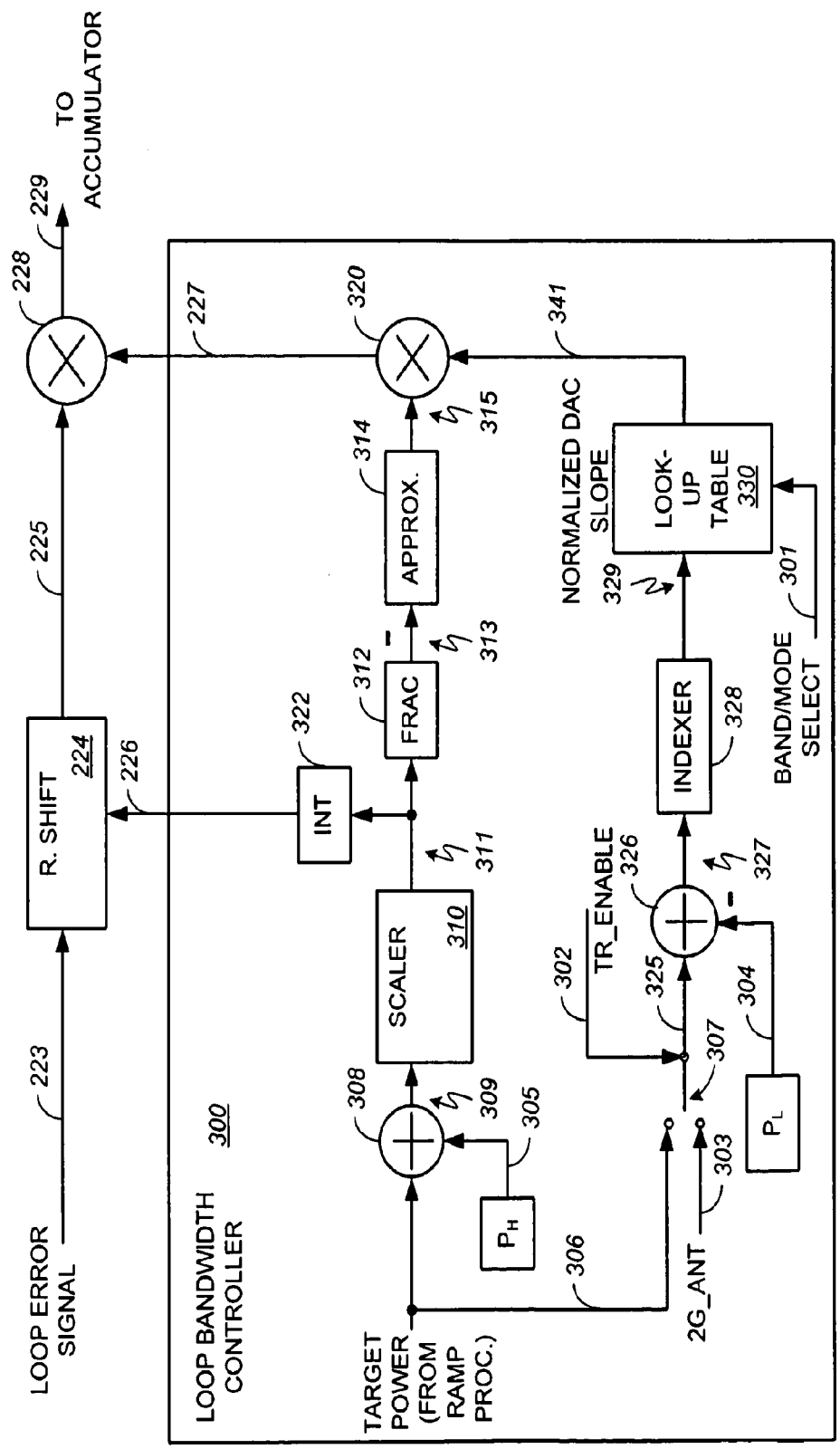
FIG. 3 is a block diagram illustrating an embodiment of the loop bandwidth controller of FIG. 2.

FIG. 3 is a block diagram illustrating an embodiment of the loop bandwidth controller 300 of FIG. 2. The loop bandwidth controller 300 receives multiple signals from the baseband subsystem 110 that direct the loop bandwidth controller 300 to apply one of a target power input from a ramp processor of the handset or a second generation or 2G antenna power when generating appropriate bandwidth control signals for application in the closed loop of the adaptive power controller 200 of FIG. 2. The loop bandwidth controller 300 receives the target power on connection 301, a transmit enable signal on connection 302, a 2G antenna power signal on connection 303, and a band/mode select input signal on connection 305. In addition to these inputs, the loop bandwidth controller applies a maximum transmit power or $P_H$ on connection 306 and a minimum power or $P_L$ on connection 304. In response, the loop bandwidth controller 300 generates and forwards a first bandwidth control signal on connection 226 and a second bandwidth control signal on connection 227. As described above, the first bandwidth control signal is coupled to a control input of the right shifter 224 and the second bandwidth control signal is coupled to a control input of the scaler 228.

When the transmit enable signal on connection 302 directs the switch 307 to apply the target power level on connection 301, the switch 307 forwards the target power signal on connection 325 to the adder 326. When the transmit signal on connection 302 directs the switch 307 to apply the 2G antenna power on connection 303, the switch 307 forwards the 2G antenna power on connection 325 to the adder 326.

The adder 326 is also arranged to receive the minimum transmit power level on connection 304. The adder 326 forwards the difference of the target power level and the minimum transmit power level on connection 327 to the indexer 328. The indexer 328 processes the received difference signal and generates an index control signal that is forwarded on connection 329 to the look-up table 330. The look-up table 330, in response to the index control signal and the band/mode select signal on connection 305, identifies a select entry in the table and forwards a normalized DAC slope on connection 341 to the scaler 320.

The target power level on connection 306 and the maximum transmit power level on connection 306 are coupled to the adder 308. The adder forwards the sum of the received values on connection 309 to the scaler 310. Note that additional circuitry will be needed to ensure that the output of the adder 308 is a positive number when the target power is provided in dBm. The scaler 310 scales the sum of the target power received from the ramp processor of the handset with the maximum transmit power to generate and forward a digital representation of a real number on connection 311. An integer element or INT 322 receives the real number on connection 311 and forwards the integer portion of the number on connection 226. The integer portion of the real number is the first bandwidth control signal. A fractional element or FRAC 312 receives the real number on connection 311 and forwards a representation of the fractional portion thereof on connection 313 to the approximator 314. The approximator 314 uses an approximation process to adjust the fractional portion of the real number to generate a scaler control signal that is forwarded on connection 315 to the scaler 320. In turn, the scaler 320 applies the scaler control signal to generate a scaled version of the normalized DAC slope which is forwarded on connection 227 to the scaler 228 in the closed control loop of the adaptive power controller 200 (FIG. 2). The scaled version of the normalized DAC slope is the second bandwidth control signal.

Figure 4:
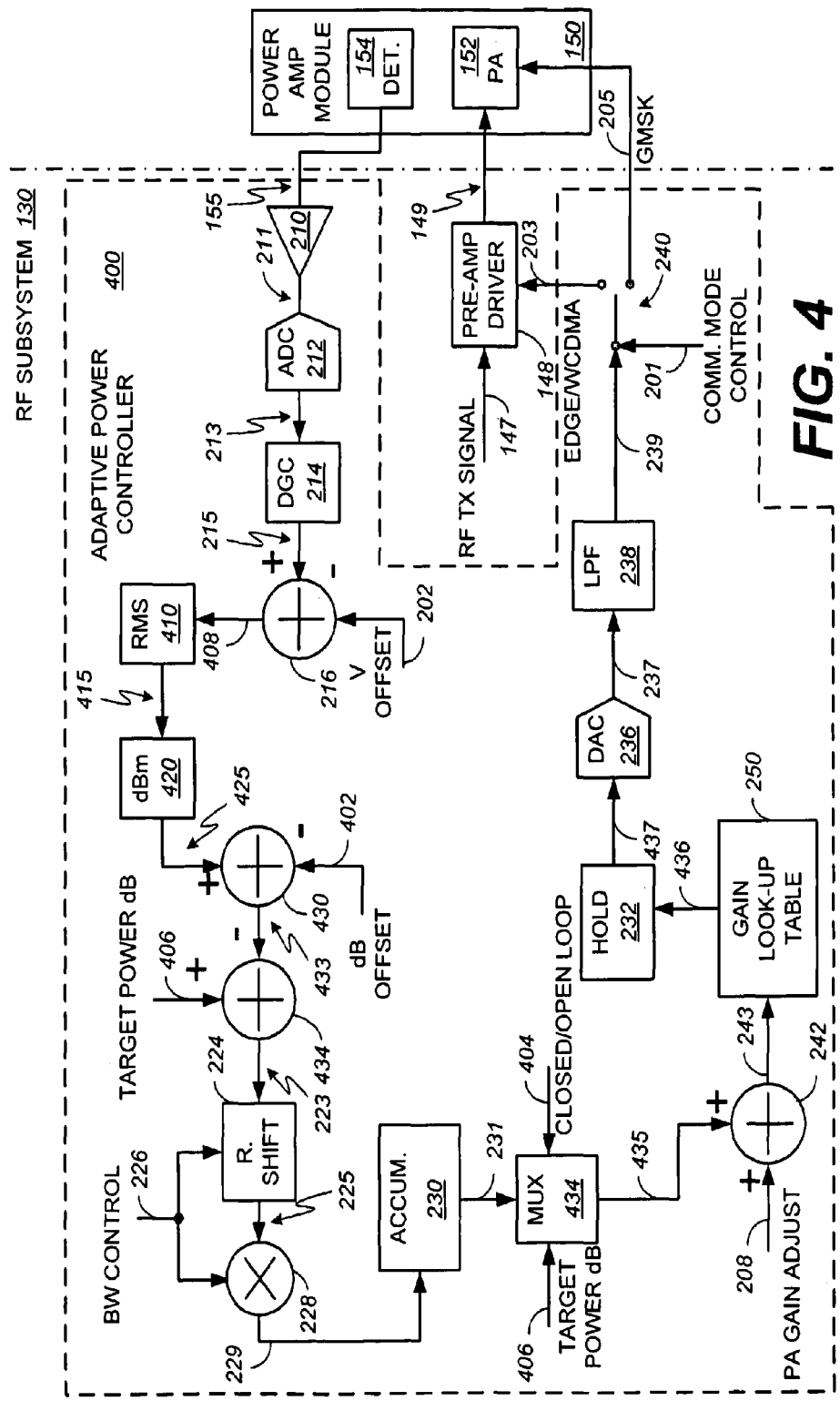
FIG. 4 is a block diagram illustrating an alternative embodiment of the adaptive power controller of FIG. 1.

FIG. 4 is a block diagram illustrating an alternative embodiment of the adaptive power controller of FIG. 1. The combination of the power amplifier module 150 and the adaptive power controller 400 forms closed and open power control loops for adjusting transmit power levels in near real time. The adaptive power controller 400 receives multiple signals from the baseband subsystem 110 that direct the adaptive power controller 400 to apply one of a closed control loop or an open control loop within the RF subsystem 130 of the handset. The adaptive power controller 400 receives a communication mode control signal on connection 201, a voltage offset signal on connection 202, a dB offset signal on connection 402, a closed/open loop control signal on connection 404, a target power level in dB on connection 406, and a power amplifier gain adjust signal on connection 208. In response, the adaptive power controller 400 generates an analog power control signal that is controllably applied at the pre-amplifier driver 148 or the at the power amplifier 152.

The detector 154 within the power amplifier module 150 forwards a detected transmit power signal on connection 155 to preamp 210, which buffers and amplifies the detected transmit power signal before forwarding the signal on connection 211 to an analog-to-digital converter (ADC) 212. The ADC 212 converts the analog voltage to a digital signal and forwards the same on connection 213 to the digital gain control element (DGC) 214. The DGC 214 scales and forwards the digital version of the detected transmit power on connection 215 to the adder 216. The adder 216 subtracts the voltage offset signal on connection 202 from the digital version of the detected transmit power signal and forwards the result on connection 408 to the RMS element 410 which generates a root-mean square representation of the detected transmit power and forwards the same on connection 415 to dBm converter 420. The dBm converter 420 converts the signal on connection 415 (representing a voltage) using a log conversion to generate detected transmit power in dBm. The dBm converter 420 forwards the result on connection 425 to the adder 430, which subtracts the dB offset signal received on connection 402. The adder 430 forwards the result on connection 433 to the adder 434.

The target power level received on connection 406 is coupled to the other input of the adder 434, which subtracts the detected transmit power from the target power level signal and forwards an error signal on connection 223 to a right shifter 224. In the illustrated embodiment, a fixed bandwidth control signal is coupled on connection 226 to a control input of the right shifter 224 as well as to the scaler 228. The right shifter 224 processes the error signal in accordance with the fixed bandwidth control signal (BW control) and forwards the shifted error signal on connection 225 to the scaler 228. The scaler 228 adjusts the shifted error signal in accordance with the fixed bandwidth control signal to generate a modified error signal, which is forwarded to the accumulator 230 on connection 229. The accumulator 230 integrates the modified error signal and forwards the result on connection 231 to the multiplexer 434. The multiplexer 434 receives the target power signal on connection 406 and forwards one of the target power signal or the modified and integrated error signal on connection 435 in accordance with the closed/open loop control signal on connection 404.

When directed by the closed/open loop signal on connection 404 to operate in a closed loop, that is when the target power level exceeds a predetermined threshold value, the multiplexer 434 forwards the integrated and filtered version of the modified error signal on connection 435 to the adder 242, the adder 242 also receives a power amplifier gain adjust control signal on connection 208. The power amplifier gain adjust control signal received from the baseband subsystem 110 is responsive to one or both of a present temperature and a desired transmit frequency band of the handset. The adder 242 generates and forwards a combined signal on connection 243 which is used as an index to identify a code in the gain look-up table 250. The gain look-up table 250 linearizes changes in the dB linear control characteristic within the adaptive power controller 400 to make the loop bandwidth constant over the entire power control range.

The gain look-up table forwards a combination of the gain adjusted modified error signal via connection 436 to the hold element 232, which averages the combined signal on connection 437 to the DAC 236. The DAC 236 converts the integrated and filtered version of the modified error signal to generate an analog power control signal, which is forwarded on connection 237 to the low-pass filter (LPF) 238. The LPF 238 reduces or eliminates high-frequency signal components that may be present in the power control signal before forwarding the filtered power control signal on connection 239 to the switch 240. As indicated in FIG. 2, the switch 240 directs the power control signal to the pre-amplifier driver 148 on connection 203 when the communication mode control signal on connection 201 indicates that the handset is operating under an EDGE/WCDMA communication mode. Otherwise, the switch 240 directs the power control signal to the power amplifier 150 on connection 205 when the communication mode control signal on connection 201 indicates that the handset of operating under a GMSK communication mode.

When the target power level is below the threshold value, the closed/open loop control signal on connection 404, directs the multiplexer 434 to forward the target power signal on connection 406 on connection 435 to the adder 242, where it is combined with the power amplifier gain adjustment signal received on connection 208. In this case, the gain adjusted target power signal on connection 243 is used as an index to select a code form the gain look-up table 250. Further processing of the select code in generating the power control signal occurs as described above.

The closed-loop adaptive bandwidth control illustrated and described above in association with FIG. 4, is responsive to a voltage representation of the transmit power level. Alternatively, a log detector could be used to replace the detector 154. When a log detector is used, the log conversion performed by the dBm converter 420 is not required. The control scheme permits the re-use of the closed-loop components for both WCDMA and EDGE/GMSK communication standards. The proposed scheme is also suitable for providing a full range of transmit power control as well as controlled power ramp-up and ramp-down transitions in EDGE/GMSK mode.

Figure 5:
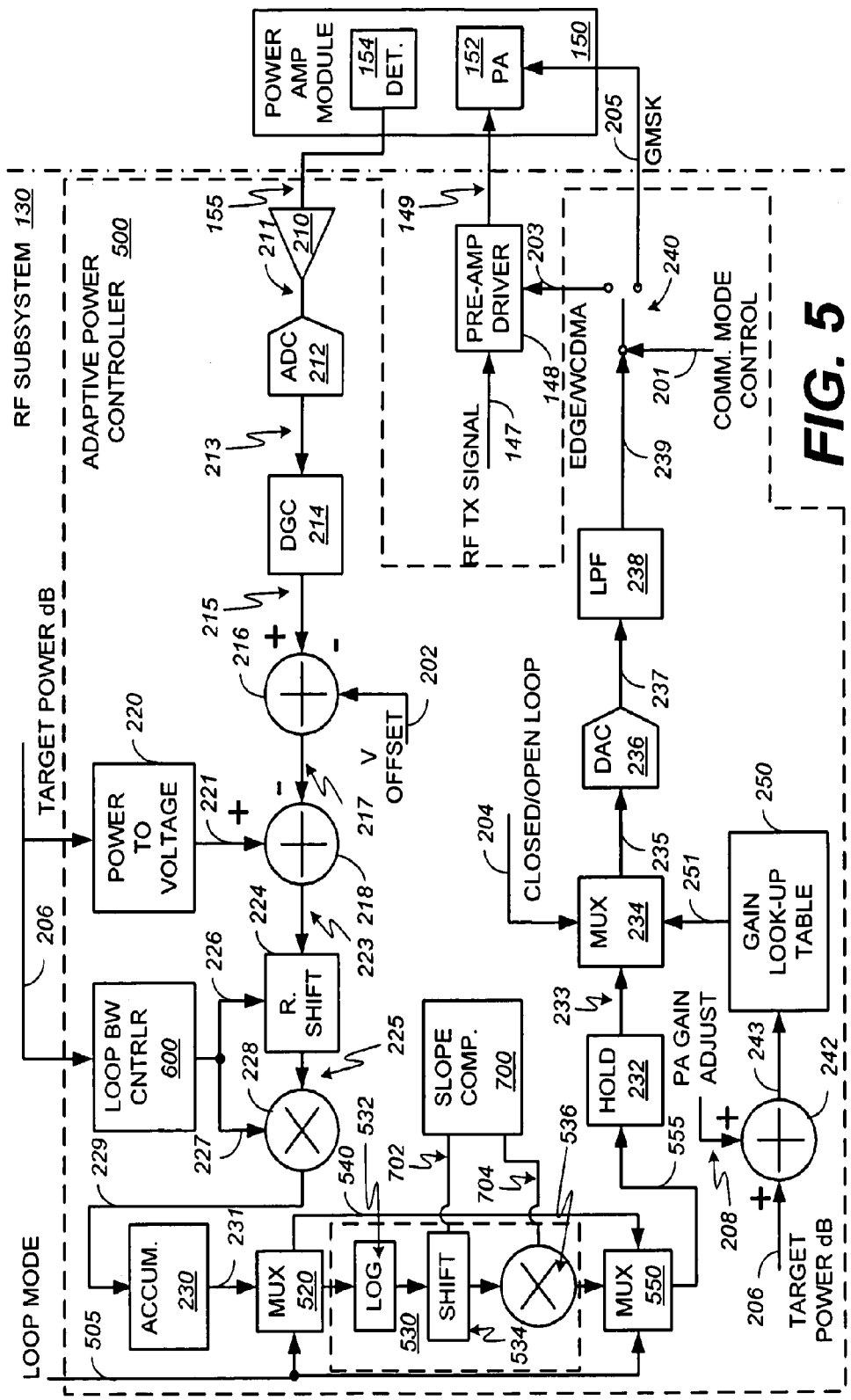
FIG. 5 is a block diagram illustrating another alternative embodiment of the adaptive power controller of FIG. 1.

FIG. 5 is a block diagram illustrating another alternative embodiment of the adaptive power controller of FIG. 1. The combination of the power amplifier module 150 and the adaptive power controller 500 forms closed and open power control loops for adjusting transmit power levels in near real time. The adaptive power controller 500 receives multiple signals from the baseband subsystem 110 that direct the adaptive power controller 500 to apply one of a closed control loop or an open control loop within the RF subsystem 130 of the handset. The adaptive power controller 500 receives a communication mode control signal on connection 201, a voltage offset signal on connection 202, a closed/open loop control signal on connection 204, a target power level in dB on connection 206, a power amplifier gain adjust signal on connection 208, and a loop mode control signal on connection 505. In response, the adaptive power controller 500 generates an analog power control signal that is controllably applied at the pre-amplifier driver 148 or the at the power amplifier 152.

The detector 154 within the power amplifier module 150 forwards a detected transmit power signal on connection 155 to preamp 210, which buffers and amplifies the detected transmit power signal before forwarding the signal on connection 211 to the ADC 212. The ADC 212 converts the analog voltage to a digital signal and forwards the same on connection 213 to the DGC 214. The DGC 214 scales and forwards the digital version of the detected transmit power on connection 215 to the adder 216. The adder 216 subtracts the voltage offset signal on connection 202 from the digital version of the detected transmit power signal and forwards the result on connection 217 to the adder 218.

The target power level received on connection 206 is converted from a log value (in dBm) to a linear unit (volts) by the power to voltage converter 220, which forwards the result on connection 221 to the adder 218. The adder 218 subtracts the detected and offset adjusted transmit power signal from the target power level in volts to generate an error signal, which is forwarded on connection 223 to a right shifter 224.

As illustrated in FIG. 5, the target power level received on connection 206 is coupled to a loop bandwidth controller 600 that generates a first bandwidth control, which is forwarded on connection 226 to a control input of the right shifter 224. In addition, the loop bandwidth controller 600 generates a second bandwidth control signal, which is forwarded to a scaler 228 on connection 227. The loop bandwidth controller 600 is further described in association with the embodiment illustrated in FIG. 6.

The right shifter processes the error signal in accordance with the first bandwidth control signal and forwards the shifted error signal on connection 225 to the scaler 228. The scaler 228 adjusts the shifted error signal in accordance with the second bandwidth control signal to generate a modified error signal, which is forwarded to the accumulator 230 on connection 229. The accumulator 230 integrates the modified error signal and forwards the result on connection 231 to the multiplexer 520.

The multiplexer 520 and the multiplexer 550 operate under the control of the loop mode signal on connection 505. When a dB linear control characteristic is desired, the loop mode signal directs the multiplexer 520 to forward the modified error signal through the elements of a logarithmic control path 530. Otherwise, when a voltage linear control characteristic is desired, the loop mode signal directs the multiplexer 520 to forward the modified error signal on connection 540, which bypasses the logarithmic control path 530. The multiplexer 550 in accordance with the loop mode control signal on connection 505, controllably forwards the output of one of the logarithmic control path 530 or the bypass path (i.e., the modified error signal connection 540) on connection 555 to the hold element 232.

The logarithmic control path 530 includes a series arrangement of a log converter 532, a right shifter 534 and a multiplier 536. The right shifter 534 receives a third bandwidth control signal on connection 702 from the slope compensator 700. The multiplier 536 receives a fourth bandwidth control signal on connection 704 from the slope compensator 700. The slope compensator 700 is further described in association with the embodiment illustrated in FIG. 7. The right shifter 534 processes the modified error signal in accordance with the third bandwidth control signal and forwards the shifted and modified error signal to the multiplier 536. The multiplier 536 adjusts the shifted and modified error signal in accordance with the second bandwidth control signal to generate a modified error signal, which is forwarded to the hold element 232 via the multiplexer 550 and connection 555. The hold element 232 filters or averages the integrated and slope compensated version of the modified error signal and forwards the result on connection 233 to a first data input of the multiplexer 234.

When directed by the closed/open loop signal on connection 204 to operate in a closed loop, that is when the target power level exceeds a predetermined threshold value, the multiplexer 234 forwards the integrated, slope compensated, and filtered version of the modified error signal on connection 235 to the DAC 236. The DAC 236 converts the integrated, slope compensated, and filtered version of the modified error signal to generate an analog power control signal, which is forwarded on connection 237 to the LPF 238. The LPF 238 reduces or eliminates high-frequency signal components that may be present in the power control signal before forwarding the filtered power control signal on connection 239 to the switch 240. As indicated in FIG. 5, the switch 240 directs the power control signal to the pre-amplifier driver 148 on connection 203 when the communication mode control signal on connection 201 indicates that the handset is operating under an EDGE/WCDMA communication mode. Otherwise, the switch 240 directs the power control signal to the power amplifier 150 on connection 205 when the communication mode control signal on connection 201 indicates that the handset of operating under a GMSK communication mode.

The adaptive power controller 500 receives the target power level on connection 206 and a power amplifier gain adjust control signal on connection 208 which are coupled to the inputs of the adder 242. The power amplifier gain adjust control signal received from the baseband subsystem 110 is responsive to one or both of a present temperature and a desired transmit frequency band of the handset. The adder 242 generates and forwards a combined signal which is applied at an index input of the gain look-up table 250. In turn, the gain look-up table forwards a code on connection 251 to a second data input of the multiplexer 234. When the target power level is below the threshold value, the closed/open loop control signal on connection 204, directs the multiplexer 234 to forward the code on connection 235 to the DAC 236. In this open loop mode of operation, the code as converted by the DAC 236 becomes the power control signal that is low-pass filtered and forwarded to one of the pre-amplifier driver 148 or the power amplifier 150 as described above.

The closed-loop adaptive bandwidth control illustrated and described above in association with FIG. 5, is responsive to a voltage representation of the transmit power level. The control scheme permits the re-use of the closed-loop components for both WCDMA and EDGE/GMSK communication standards. The proposed scheme is also suitable for providing a full range of transmit power control as well as controlled power ramp-up and ramp-down transitions in EDGE/GMSK mode. The bandwidth control signals are applied in two different locations to compensate for the nonlinearity of the gain control characteristics to make the loop bandwidth constant over the entire power control range. For voltage linear gain control characteristics, the slope compensation is applied before the accumulator 230. For dB linear control characteristics, slope compensation is applied after a log conversion.

Figure 6:
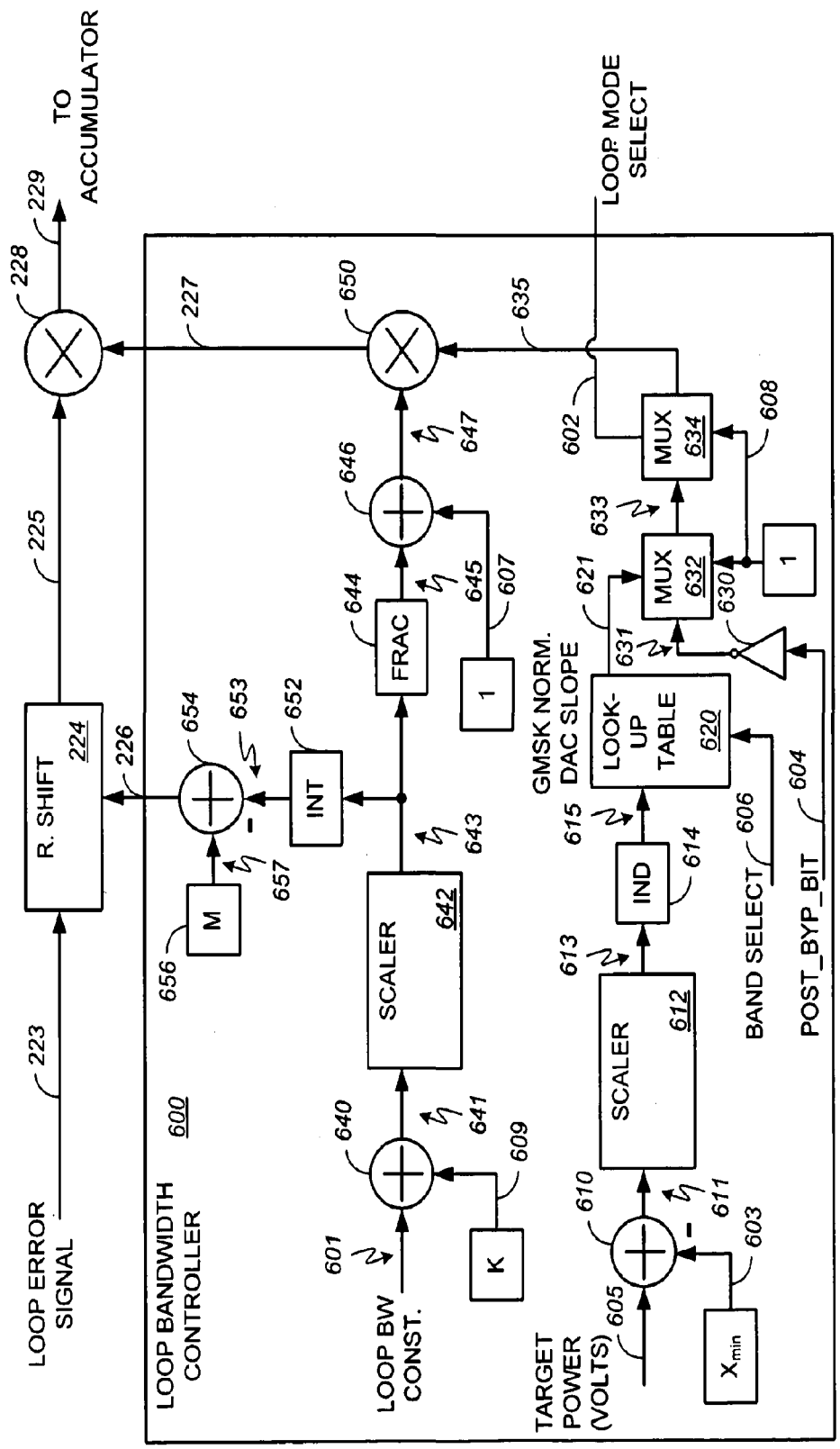
FIG. 6 is a block diagram illustrating an embodiment of the loop bandwidth controller of FIG. 5.

FIG. 6 is a block diagram illustrating an embodiment of the loop bandwidth controller 600 of FIG. 5. The loop bandwidth controller 600 receives multiple signals from the baseband subsystem 110 that direct the loop bandwidth controller 600 to apply a loop bandwidth constant and a target power when generating appropriate bandwidth control signals for application in the closed loop of the adaptive power controller 500 of FIG. 5. The loop bandwidth controller 600 receives the loop bandwidth constant on connection 601, a loop mode select signal on connection 602, a post bypass bit on connection 604, the target power on connection 605, and a band select input signal on connection 306. In addition to these inputs, the loop bandwidth controller 600 applies a minimum power or $X_{min}$ on connection 304 and a constant K on connection 609. In response, the loop bandwidth controller 600 generates and forwards a first bandwidth control signal on connection 226 and a second bandwidth control signal on connection 227. As described above, the first bandwidth control signal is coupled to a control input of the right shifter 224 and the second bandwidth control signal is coupled to a control input of the scaler 228.

The adder 610 is arranged to receive the target power in volts on connection 605 and the minimum transmit power level on connection 603. The adder 610 forwards the difference of the target power level and the minimum transmit power level on connection 611 to the scaler 612. The scaler 612 scales the difference of the target power level and the minimum transmit power level and forwards the result on connection 613 to the indexer 614. The indexer 614 processes the received signal and generates an index control signal that is forwarded on connection 615 to the look-up table 620. The look-up table 620, in response to the index control signal and the band select signal on connection 606, identifies a select entry in the table and forwards a GMSK normalized DAC slope on connection 621 to a first data input of the multiplexer 632. The multiplexer 632 receives a binary 1 on its second data input. The post bypass bit signal 604 is inverted by inverter 630 and coupled to the control input of the multiplexer 632 via connection 631. In accordance with the signal on connection 631, the multiplexer 632 forwards one of the binary 1 or the GMSK normalized DAC slope value on connection 633 which is coupled to a first data input of the multiplexer 634. A second data input of the multiplexer 634 is arranged to receive the binary 1 on its second data input. In accordance with the loop mode select input signal on connection 602, the multiplexer 634 forwards one of the signal on connection 633 or the binary 1 on connection 635 to the scaler 650. When it is desired to correct the bandwidth for a dB linear control characteristic, the binary 1 is forwarded to the scaler 650.

The loop bandwidth constant on connection 601 and the constant K on connection 609 are coupled to the adder 640. The adder 640 forwards the sum of the received values on connection 641 to the scaler 642. The scaler 642 scales the sum of the loop bandwidth constant and K to generate and forward a digital representation of a real number on connection 643. An integer element or INT 652 receives the real number on connection 643 and forwards the integer portion of the number on connection 653 to the adder 654. The adder 654 receives an integer M on connection 657 and forwards the difference of the integer M and the integer portion of the real number on connection 226. The difference of the integer M and the integer portion of the real number is the first bandwidth control signal. A fractional element or FRAC 644 receives the real number on connection 643 and forwards a representation of the fractional portion thereof on connection 645 to the adder 646. The adder receives a binary 1 on connection 607. The sum of the fractional portion of the real number and the binary 1 is forwarded via connection 647 to the scaler 650. In turn, the scaler 650 generates a scaled version of the GMSK normalized DAC slope or the binary 1. The scaled output signal is forwarded on connection 227 to the scaler 228 in the closed control loop of the adaptive power controller 500 (FIG. 5). The scaled output signal is the second bandwidth control signal.

Figure 7:
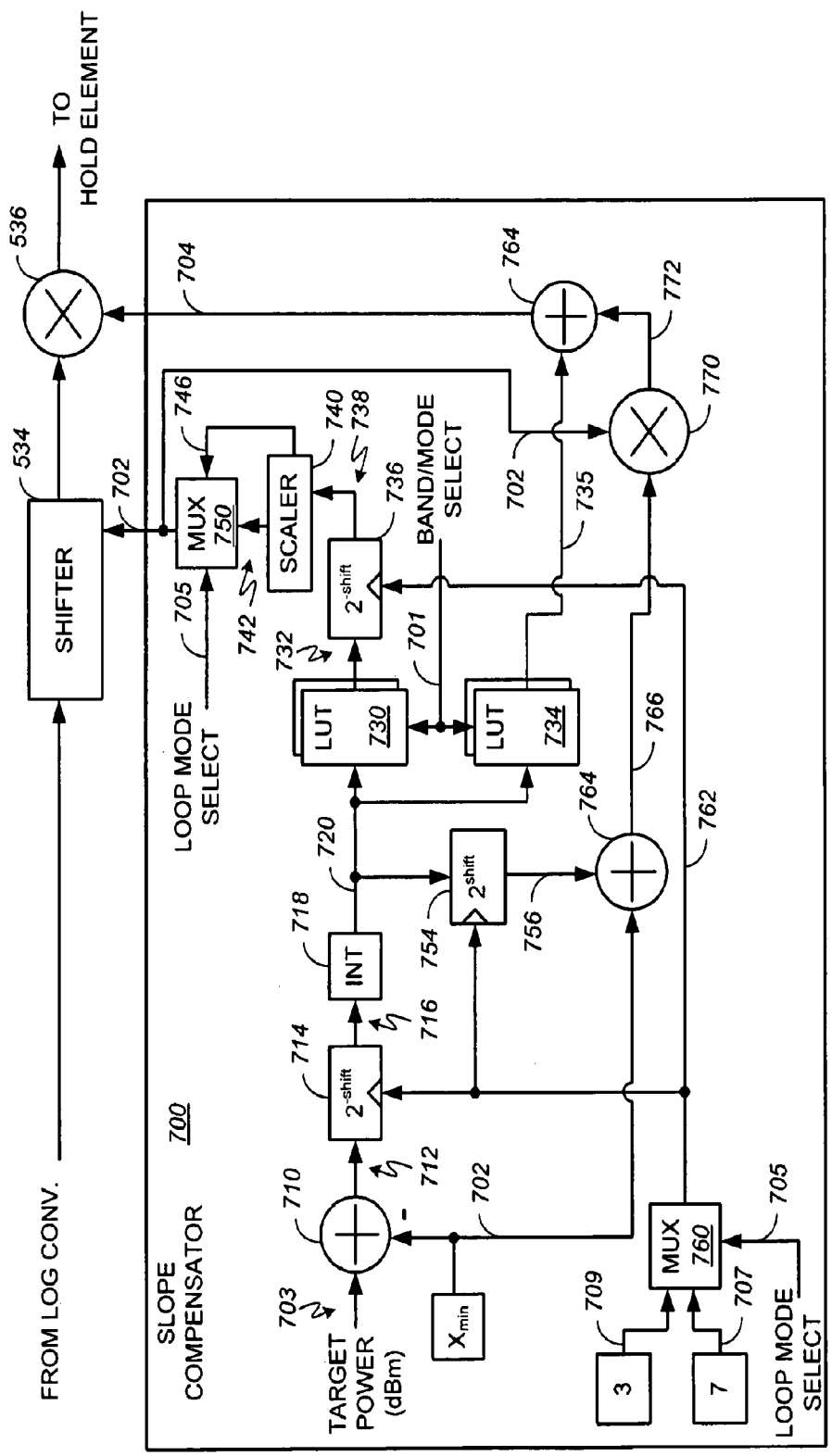
FIG. 7 is a block diagram illustrating an embodiment of the slope compensator of FIG. 5.

FIG. 7 is a block diagram illustrating an embodiment of the slope compensator 700 of FIG. 5. The slope compensator 700 receives multiple signals from the baseband subsystem 110 that direct the slope compensator to generate appropriate bandwidth control signals for application in the closed loop of the adaptive power controller 500 of FIG. 5. The slope compensator 700 receives a band/mode select signal on connection 701, a target power level signal on connection 703 and a loop mode select signal on connection 705. In addition to these inputs, the slope compensator 700 600 applies a minimum power or $X_{min}$ on connection 702 and first and second constants on connection 707 and connection 709, respectively. In response, the slope compensator 700 generates and forwards a third bandwidth control signal on connection 702 and a fourth bandwidth control signal on connection 704. As described above, the third bandwidth control signal is coupled to a control input of the right shifter 534 and the fourth bandwidth control signal is coupled to a control input of the scaler 536.

In accordance with the loop mode select signal on connection 705, the multiplexer 760 controllably forwards one of the first and second constants on connection 762, which is coupled to the control inputs of shifter 714, shifter 736, and shifter 754. The shifter 714, the shifter 736, and the shifter 754 controllably forward through the slope compensator 700 in the process of generating the third bandwidth control signal on connection 702 and the fourth bandwidth control signal on connection 704.

The adder 710 receives the target power (in dBm) on connection 703 and a minimum transmit power on connection 702. The slope compensator 700 subtracts the minimum transmit power from the target power level and forwards the result on connection 712 to the shifter 714. The shifter 714 processes the result and forwards a shifted version of the same on connection 716 to the integer element 718. The integer element 718 forwards the integer portion of the signal on connection 716 to the shifter 754, the look-up table 730 and the look-up table 734 via connection 720. The look-up table 730 is actually several tables that operate under the control of the band/mode select input 701 and the output of the integer element 718. The look-up table 730 includes DAC slope values, a select one of which is forwarded on connection 732 to the shifter 736. The shifter 736 forwards the processed DAC slope value on connection 738 to the scaler 740. The scaler 740 generates a first scaled signal which is forwarded on connection 742 to a first data input of the multiplexer 750. In addition, the scaler 740 generates a second scaled signal, different in magnitude from the first scaled signal, which is forwarded on connection 746 to a second data input of the multiplexer 750. The multiplexer 750 forwards one of the first scaled signal or the second scaled signal on connection 702 in accordance with the loop mode select signal on connection 705.

As indicated in FIG. 7, the connection 702 is also coupled to the control input of the scaler 770. The adder 764 adds the minimum transmit power received on connection 702 with the shifted version of the integer portion of the difference between the target power and the minimum transmit power received on connection 756 and forwards the result on connection 766 to the scaler 770. The scaler 770 adjusts the signal on connection 766 in accordance with the third bandwidth control signal received on connection 702 and forwards the result on connection 772 to the adder 764. The look-up table 734 is actually several tables that operate under the control of the band/mode select input 701 and the output of the integer element 718. The look-up table 734 includes DAC offset values, a select one of which is forwarded on connection 735 to the adder 764. The adder 764 sums the DAC offset value with the scaled signal on connection 772 and forwards the result on connection 704. The result on connection 704 is the fourth bandwidth control signal.

Figure 8:
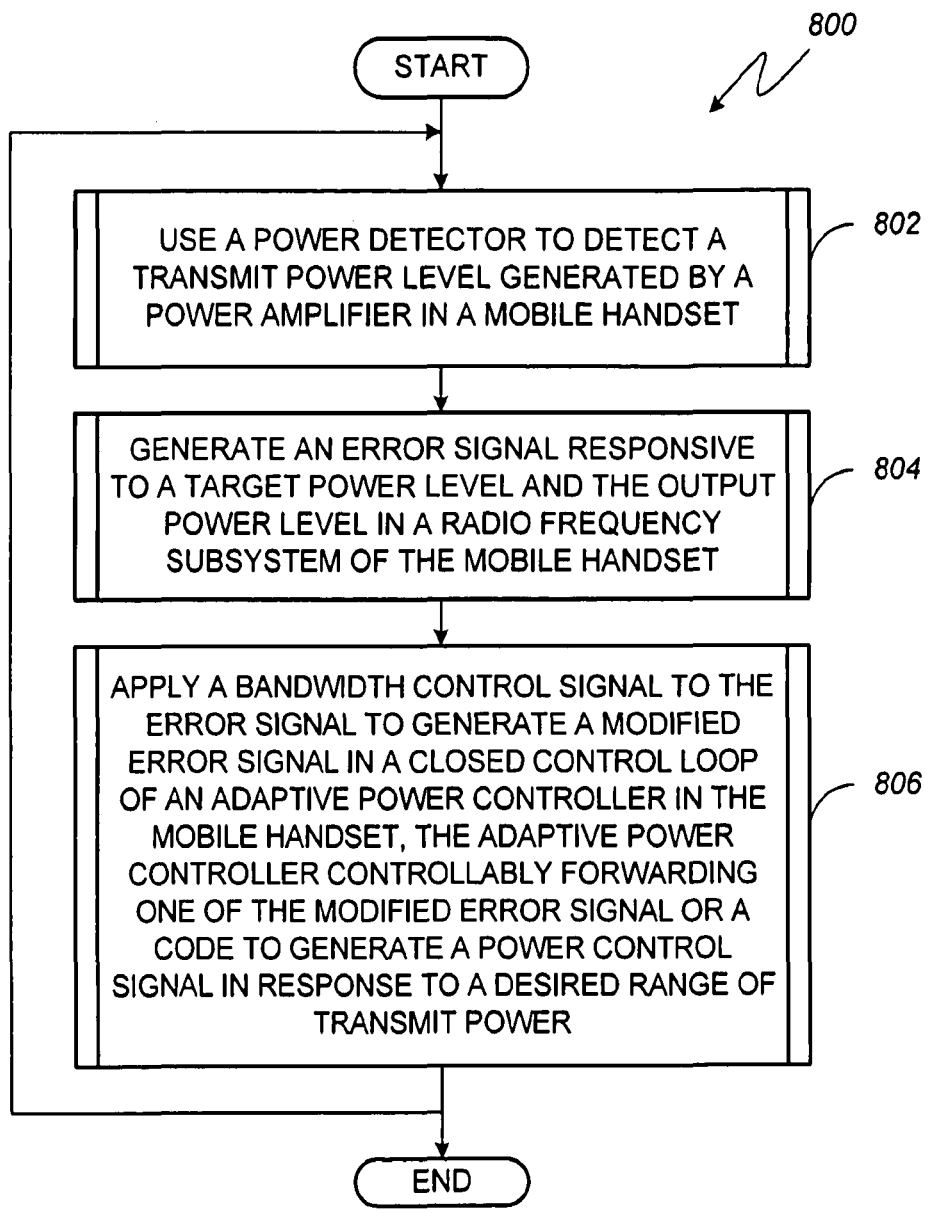
FIG. 8 is a flow chart illustrating an embodiment of a method for adaptive power control in a mobile handset.

FIG. 8 is a flow chart illustrating the operation of an embodiment of a method for adaptive power control in a mobile handset transmitter. The flow diagram of FIG. 8 shows the architecture, functionality, and operation of a possible implementation via software and or firmware associated with an adaptive power controller arranged with a direct launch transmitter. In this regard, a block can represent a module, segment, or portion of code, which comprises one or more executable instructions for implementing the specified function(s). When the adaptive power controller is implemented via hardware, hardware and firmware or a combination of hardware and software, one or more blocks in the flow diagram may represent a circuit or circuits forming an element. Alternatively, the described functions can be embodied in source code including human-readable statements written in a programming language or machine code that comprises instructions recognizable by a suitable execution system such as a processor in a computer system. The machine code may be converted from the source code, etc.

Method 800 begins with block 802 where a power detector is used to detect an output power level generated by a power amplifier in a mobile handset. Next, as indicated in block 804, an error signal is generated in response to a function of a target power level and the output power level in a radio frequency sub-system of the mobile handset. Thereafter, as shown in block 806, a bandwidth control signal is applied to the error signal to generate a modified error signal in a closed control loop of an adaptive power controller in the mobile handset. As further indicated in block 806, in response to a desired range of transmit power, the adaptive power controller controllably forwards one of the modified error signal or a code to generate a power control signal. As explained above, when the mobile handset is operating in one of an EDGE or WCDMA mode (i.e., modes where dB linear amplification is desired to track the changing transmit power level), the power control signal is forwarded to a pre-amplifier driver, which amplifies the transmit signal before forwarding the pre-amplified transmit signal to the power amplifier. Otherwise, when the mobile handset is operating in a GMSK mode (i.e., a mode where a well controlled transmit power ramp up and ramp down is desired), the power control signal is forwarded to the power amplifier. As also explained above, when the target transmit power as provided by a power target input signal from the baseband subsystem is less than a desired threshold, the adaptive power controller is configured to apply the target power input signal to a gain control look-up table to select an appropriate code to apply at the input to a digital to analog converter to generate the power control signal.

While various embodiments of the adaptive power controller and methods for adaptive power control in a mobile handset have been described, it will be apparent to those of ordinary skill in the art that many more embodiments and implementations are possible that are within the scope of this disclosure. Accordingly, the adaptive power controller and methods are not to be restricted except in light of the attached claims and their equivalents.

What is claimed is:

1. A method for adaptive bandwidth control in a mobile handset transmitter, comprising:

using a power detector to detect an output power level generated by a power amplifier;

generating an error signal responsive to a target power level and the output power level in a radio frequency sub-system of the mobile handset; and applying a bandwidth control signal to the error signal to generate a modified error signal in a closed control loop of an adaptive power controller in the mobile handset, the adaptive power controller controllably forwarding one of the modified error signal or a code to generate a power control signal in response to a desired range of transmit power, the adaptive power controller including a first shifter and a first scaler, said applying the bandwidth control signal to the error signal including applying a logarithmic control path to a filtered error signal, the logarithmic control path including a log converter, a second shifter, and a second scaler, the logarithmic control path responsive to a slope compensator coupled to the second shifter and the second scaler.

2. The method of claim 1 wherein generating the error signal responsive to the target power level includes converting the output power level from a linear scale to a logarithmic scale.

3. The method of claim 1 wherein applying the bandwidth control signal to the error signal to generate the modified error signal includes applying a loop bandwidth controller responsive to the target power level, the loop bandwidth controller operating in a first mode of operation or a second mode of operation in response to a transmit enable signal.

4. The method of claim 1 wherein generating the error signal responsive to the target power level and the output power level includes generating a logarithmic value and applying the bandwidth control signal to the error signal to generate the modified error signal includes applying a constant logarithmic value to elements within the closed control loop.

5. The method of claim 4 wherein controllably forwarding the code includes sending a value from a look-up table in the closed control loop.

6. The method of claim 1 wherein generating the error signal responsive to the target power level includes converting the target power level from a logarithmic scale to a linear scale.

7. The method of claim 6 wherein controllably forwarding the code to generate the power control signal includes sending a value from a look-up table outside the closed control loop.

8. The method of claim 1 wherein controllably forwarding one of the modified error signal or the code includes forwarding the code when the target power level is less than a desired threshold value.

9. The method of claim 1 wherein controllably forwarding one of the modified error signal or the code includes forwarding the modified error signal when the target power level is greater than a desired threshold value.

10. The method of claim 1 further comprising applying an accumulator to the modified error signal to generate an integrated error signal.

11. The method of claim 1 wherein the slope compensator is responsive to a transmit mode and a frequency band.

12. The method of claim 11 wherein the slope compensator is responsive to the target power level and a minimum power level.

13. The method of claim 1 wherein applying the bandwidth control signal to the error signal to generate the modified error signal includes applying a loop bandwidth controller that receives the target power level in a logarithmic unit and forwards the bandwidth control signal in a linear unit.

14. The method of claim 13 wherein the loop bandwidth controller is responsive to a loop bandwidth constant.

15. The method of claim 1 further comprising controllably applying the power control signal to a pre-amplifier driver when communicating via EDGE and WCDMA communication standards and to a power amplifier when communicating via GMSK.

16. A mobile handset, comprising:
a power amplifier module including a power amplifier and a power detector, the power amplifier arranged to receive a transmit signal and a power control signal and generate an amplified transmit signal, the power detector configured to generate a detector output responsive to the amplified transmit signal power;
an adaptive power controller coupled to the power amplifier module, the adaptive power controller forming a closed control loop with the power amplifier module, the adaptive power controller including a first shifter, a first scaler, an accumulator and a hold element, the first shifter and the first scaler being arranged to receive a bandwidth control signal and in combination generate a modified error signal responsive to an error signal generated from a target power level and the detector output, the accumulator and hold element filtering the modified error signal to generate the power control signal; and
a logarithmic control path inserted in the closed loop between the accumulator and the hold element, the logarithmic control path including a log converter, a second shifter, a second scaler, the logarithmic control path responsive to a slope compensator coupled to the second shifter and the second scaler.

17. The handset of claim 16 further comprising a loop bandwidth controller arranged to receive the target power level and generate a first control signal and a second control signal, the first control being applied to a first shifter control input and the second control signal being applied to a first scaler control input.

18. The handset of claim 17 wherein the loop bandwidth controller receives a loop bandwidth constant.

19. The handset of claim 16 wherein the first shifter and the first scaler receive a bandwidth control signal that is fixed in value.

20. A RF subsystem comprising:
a power amplifier module including a power amplifier and a power detector, the power amplifier arranged to receive a transmit signal and a power control signal and generate an amplified transmit signal, the power detector configured to generate a detector output responsive to the amplified transmit signal power;
an adaptive power controller coupled to the power amplifier module, the adaptive power controller forming a closed control loop with the power amplifier module, the adaptive power controller including a first shifter, a first scaler, an accumulator and a hold element, the first shifter and the first scaler being arranged to receive a bandwidth control signal and in combination generate a modified error signal responsive to an error signal generated from a target power level and the detector output, the accumulator and hold element filtering the modified error signal to generate the power control signal; and
a logarithmic control path inserted in the closed loop between the accumulator and the hold element, the logarithmic control path including a log converter, a second shifter, a second scaler, the logarithmic control path responsive to a slope compensator coupled to the second shifter and the second scaler.

* * * * *